May 3, 1927.

G. C. PEARSON 1,627,113

SNUBBER FOR VEHICLES

Filed Jan. 7, 1926

George C. Pearson
INVENTOR.

BY C. A. Hazpman
ATTORNEY

Patented May 3, 1927.

1,627,113

UNITED STATES PATENT OFFICE.

GEORGE C. PEARSON, OF YOUNGSTOWN, OHIO.

SNUBBER FOR VEHICLES.

Application filed January 7, 1926. Serial No. 79,873.

This invention relates to motor vehicles, and more particularly to snubbers to provide for better riding conditions within a vehicle.

One of the objects of the invention is to simplify the construction of snubbers, and to provide a device of this character having a minimum number of parts.

Another object of the invention is to provide a relatively small device of the character described, being a construction that will successfully operate through a wide range of movement.

Another object of the invention is to provide a snubber utilizing steel springs in conjunction with air cushions, in order to regulate and check rebounds caused by a vehicle traveling over a rough road.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
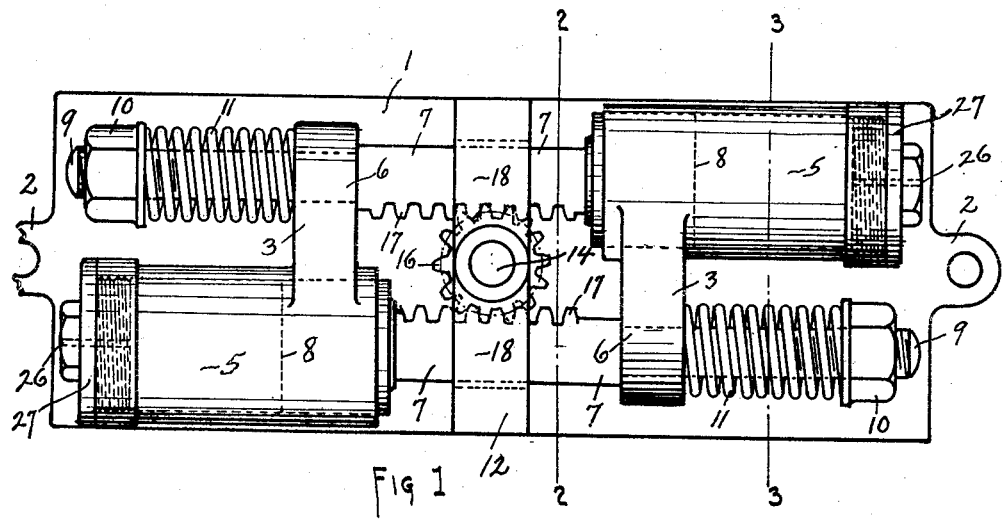
Figure 1 is a side elevation of the device with outer casing removed.

Referring to Fig. 1, it will be seen that I have provided a sturdy base member 1, provided with projections 2, for the purpose of attaching to a frame part of a vehicle. By referring to Figs. 1 and 3, it will be seen that I have provided a web member 3 formed on the inner surface 4 of the sturdy base member 1, and supporting cylinders 5, and providing for slide bearings 6, for the reception of piston shafts 7. The piston shafts 7 operating pistons 8 within the cylinders 5, and extending through the slide bearings 6. Upon the ends 9 of these piston shafts 7 there is secured by means of adjusting nuts 10 compression springs 11. By referring to Figures 1 and 2, it will be seen that there is provided bracket member 12, provided with a bearing opening 13, for the reception of a shaft 14. This shaft 14 extending through a bearing opening 15, centrally located in the sturdy base member 1. Upon this shaft 14, and situated within the bracket member 12, there is secured a cog wheel 16, which function with inwardly extending rack 17, formed on the squared central portions 18 of the piston shafts 7.

Figure 2:
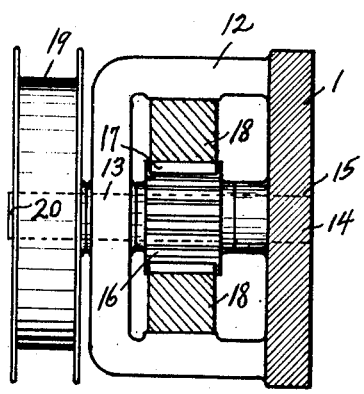
Figure 2 is a cross section taken on line 2—2 Fig. 1.
Figure 3:
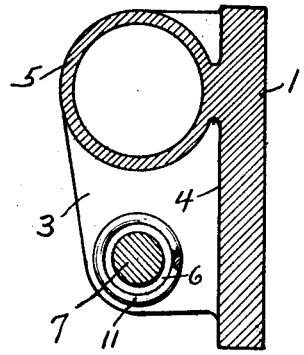
Figure 3 is a sectional view taken on line 3—3 Fig. 1.
Figure 4:
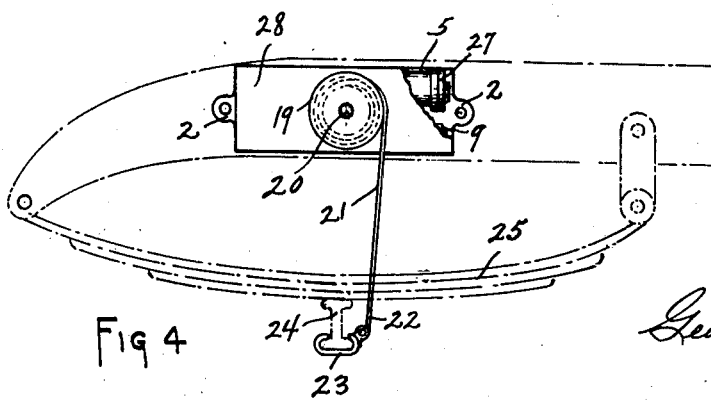
Figure 4 is a side elevation of the device attached to a vehicle with part of casing cut away.

By referring to Figs. 2 and 4, it will be seen that there is provided a drum member 19, which is secured to an outer end 20 of the shaft 14, wound upon this drum there is a flexible strap 21, the lower end 22 of which is attached to a clamp member 23, which is secured to an axle 24. It will also be seen that there is provided a casing 28, which is utilized in closing the device with the exception of the drum member 19 and connecting parts.

In operating this device, it will be seen that the piston will normally take the position shown in Fig. 1, that is, with neither piston extending into the chamber 5 enough to cause compression of the air within said chambers 5. In this normal position the tension springs 11 are at minimum tension. When the device is set in motion, due to irregularities of the road by natural tendency of the body to rebound from the pressure exerted upon the ordinary springs 25, there will be a checking influence upon this rebound by means of the oppositely positioned coil springs 11 and the cylinders 5. It will be seen that the pistons 8 will be forced into the chambers 5, and the tension springs 11 placed under increased tension. By referring to Fig. 1, it will be seen that there is provided a very small air outlet 26, in the ends of the chamber heads 27. The object of these air outlets 26 is to allow for a greater range of movement of the pistons 8, and to allow the pistons 8 to rapidly come back to normal position, in order to take up further rebounds that may be made by a continued unevenness or roughness of the road.

What I claim is:—

A snubber comprised of two air chambers, two compression springs arranged so that one compression spring and one air chamber are oppositely disposed and function upon a single piston arm, inwardly extending rack teeth formed on the central portion of each of said piston arms, a shaft, a cog wheel secured to said shaft and functioning with said inwardly extending rack teeth, a drum secured to an exposed end of said shaft, a flexible strap secured to said drum member and wound around the same, the lower end of said flexible strap secured to an axle, substantially as described for the purpose set forth.

In testimony whereof I affix my signature.

GEORGE C. PEARSON.